US011927162B2

(12) United States Patent
Stamey, Jr. et al.

(10) Patent No.: US 11,927,162 B2
(45) Date of Patent: *Mar. 12, 2024

(54) FILTER ASSEMBLY

(71) Applicant: MANN+HUMMEL Filtration Technology US LLC, Gastonia, NC (US)

(72) Inventors: Willie L. Stamey, Jr., Kings Mountain, NC (US); Nikolas H. Johansen, Charlotte, NC (US)

(73) Assignee: Mann+Hummel Filtration Technology US LLC, Gastonia, NC (US)

( * ) Notice: Subject to any disclaimer, the term of this patent is extended or adjusted under 35 U.S.C. 154(b) by 359 days.

This patent is subject to a terminal disclaimer.

(21) Appl. No.: 17/175,887

(22) Filed: Feb. 15, 2021

(65) Prior Publication Data

US 2021/0277854 A1 Sep. 9, 2021

Related U.S. Application Data

(63) Continuation of application No. 15/604,436, filed on May 24, 2017, now Pat. No. 10,920,724.

(51) Int. Cl.
*F02M 37/32* (2019.01)
*B01D 27/00* (2006.01)
(Continued)

(52) U.S. Cl.
CPC ........... *F02M 37/32* (2019.01); *B01D 27/005* (2013.01); *B01D 27/08* (2013.01); *B01D 29/11* (2013.01);
(Continued)

(58) Field of Classification Search
CPC ...... F02M 37/32; F02M 37/42; B01D 27/005; B01D 27/08; B01D 29/11; B01D 35/005;
(Continued)

(56) References Cited

U.S. PATENT DOCUMENTS

| 4,369,113 A * | 1/1983 | Stifelman | B01D 27/08 |
| | | | 210/DIG. 17 |
| 4,743,374 A * | 5/1988 | Stifelman | B01D 27/08 |
| | | | 210/DIG. 17 |

(Continued)

FOREIGN PATENT DOCUMENTS

| JP | H05141580 A | 6/1993 |
| JP | 2008525193 A | 7/2008 |
| WO | WO-2014052772 A1 | 4/2014 |

OTHER PUBLICATIONS

Canadian Patent Office, Office Action relating to Application No. 3,063,573 dated Feb. 10, 2022.
(Continued)

*Primary Examiner* — Madeline Gonzalez
(74) *Attorney, Agent, or Firm* — Honigman LLP

(57) ABSTRACT

A filter assembly includes a housing, a proximal end cap, and a nut plate. The housing defines a longitudinal axis and includes an inner surface surrounding the longitudinal axis. The proximal end cap is disposed within the housing and defines a central aperture. The nut plate is disposed within the housing and includes a flange portion and an outer wall. The flange portion is disposed within the central aperture. The outer wall includes a plurality of protrusions disposed about the longitudinal axis. At least one of the plurality of protrusions engages the inner surface to prevent rotation of the nut plate relative to the housing.

8 Claims, 4 Drawing Sheets

(51) Int. Cl.
- *B01D 27/08* (2006.01)
- *B01D 29/11* (2006.01)
- *B01D 35/00* (2006.01)
- *B01D 35/30* (2006.01)
- *F01M 11/03* (2006.01)
- *F02M 37/42* (2019.01)
- *F16N 39/06* (2006.01)

(52) U.S. Cl.
CPC .......... *B01D 35/005* (2013.01); *B01D 35/30* (2013.01); *B01D 35/306* (2013.01); *F01M 11/03* (2013.01); *F02M 37/42* (2019.01); *F16N 39/06* (2013.01); *B01D 2201/301* (2013.01); *B01D 2201/302* (2013.01); *B01D 2201/304* (2013.01); *B01D 2201/342* (2013.01); *B01D 2201/347* (2013.01); *B01D 2201/4076* (2013.01)

(58) Field of Classification Search
CPC .................. B01D 35/30; B01D 35/306; B01D 2201/301; B01D 2201/302; B01D 2201/304; B01D 2201/342; B01D 2201/347; B01D 2201/4076; F01M 11/03; F16N 39/06; F16N 2039/065
USPC .............. 210/435, 440–444, 450, 493.2, 455
See application file for complete search history.

(56) References Cited

U.S. PATENT DOCUMENTS

| | | |
|---|---|---|
| 4,834,885 A | 5/1989 | Misgen et al. |
| 4,969,994 A | 11/1990 | Misgen et al. |
| 5,882,511 A | 3/1999 | Blomquist |
| 6,006,924 A | 12/1999 | Sandford |
| 10,920,724 B2 * | 2/2021 | Stamey, Jr. ............ B01D 35/30 |
| 2006/0137316 A1 | 6/2006 | Krull et al. |
| 2008/0217237 A1 | 9/2008 | Deedrich et al. |
| 2014/0008286 A1 | 1/2014 | Jiang et al. |

OTHER PUBLICATIONS

U.S. Patent and Trademark Office, Office Action relating to U.S. Appl. No. 15/604,436 dated Jun. 23, 2020.
PCT International Search Report and Written Opinion, relating to Application PCT/US2018/034493 dated Oct. 24, 2018.
Canadian Patent Office, Office Action relating to Application No. 3,063,573 dated Mar. 3, 2021.
Canadian Patent Office, Office Action relating to Application No. 3,063,573 dated Sep. 3, 2021.
German Patent Office, Office Action relating to Application No. 112018002689.2 dated Apr. 26, 2021.
Japanese Patent Office, Office Action relating to Application No. 2019-564966 dated Jan. 4, 2021.

* cited by examiner

FILTER ASSEMBLY

TECHNICAL FIELD

This disclosure relates to filter assemblies, and more particularly to a spin-on filter assembly having a nut plate and a housing secured together using an L-seam connection.

BACKGROUND

This section provides background information related to the present disclosure and is not necessarily prior art.

Spin-on filters may be used in fluid delivery systems and lubrication systems to remove particulates within a fuel stream or a lubrication stream between a fuel tank or a lubrication reservoir and an engine and/or other components. Spin-on filters typically mount to a mounting adapter of a fluid circuit and receive and return fluid therefrom. In some configurations, spin-on filters include a steel canister housing having an open end and a closed end. A filter element is disposed within the housing. At the open end, a connection may be provided to connect the spin-on filter to the mounting adapter in a spin-on fashion. The connection may be secured relative to the housing in order to allow the connection to absorb axial and radial forces relative to the housing. While known spin-on filters have proven acceptable for their intended purpose, there exists a continuous need for improvement in the relevant art.

SUMMARY

This section provides a general summary of the disclosure, and is not a comprehensive disclosure of its full scope or all of its features.

According to one aspect, the present disclosure provides a fluid filter assembly. The fluid filter assembly may include a housing, a proximal end cap, and a nut plate. The housing may define a longitudinal axis and may include an inner surface surrounding the longitudinal axis. The proximal end cap may be disposed within the housing and may define a central aperture. The nut plate may be disposed within the housing and may include a flange portion and an outer wall. The flange portion may be disposed within the central aperture. The outer wall may include a plurality of protrusions disposed about the longitudinal axis. At least one of the plurality of protrusions may engage the inner surface to prevent rotation of the nut plate relative to the housing.

Implementations of this aspect may include one or more of the following features. In some implementations, at least one of the plurality of protrusions extends in a radial direction from the outer wall of the nut plate. The at least one of the plurality of protrusions may extend in an axial direction from a lower end of the nut plate. The at least one of the plurality of protrusions may include a convex surface. The convex surface may define a portion of a sphere.

In some implementations, the inner surface includes a proximal portion having a proximal extent extending in a first direction, and a distal extent extending in a second direction transverse to the first direction. The plurality of protrusions may engage the proximal extent and the distal extent. The proximal extent may extend in a radial direction and the distal extent may extend in an axial direction.

In some implementations, the fluid filter assembly includes a seal member sealingly engaging the outer wall.

In some implementations, the fluid filter assembly includes a seal member disposed about the flange portion of the nut plate. The proximal end cap may include a lip portion extending in a direction transverse to the longitudinal axis. The seal member may sealingly engage the lip portion.

According to another aspect, the present disclosure provides a method of manufacturing a fluid filter assembly. The method may include providing a housing defining a longitudinal axis and having an inner surface. The method may also include inserting a filter element within the housing. The method may further include inserting a nut plate within the housing. The nut plate may include a plurality of protrusions disposed about the longitudinal axis. The method may also include engaging at least one of the plurality of protrusions with the inner surface to prevent rotation of the nut plate about the longitudinal axis relative to the housing. The method may further include engaging the inner surface of the housing with an end of the nut plate to secure the nut plate within the housing.

Implementations of this aspect may include one or more of the following features. In some implementations, the method includes engaging the inner surface of the housing with the end of the nut plate includes engaging a radially-extending portion of the inner surface with the plurality of protrusions. In some implementations, engaging at least one of the plurality of protrusions with the inner surface may include engaging an axially-extending portion of the inner surface with the plurality of protrusions.

In some implementations, the method includes inserting a proximal end cap within the housing. The proximal end cap may include an upper surface engaging the filter element and a lower surface facing the nut plate. The proximal end cap may define a central aperture extending through the upper surface and the lower surface.

In some implementations, the nut plate includes an annular flange. Inserting the nut plate within the housing may include inserting the annular flange within the central aperture of the nut plate.

In some implementations, at least one of the plurality of protrusions includes a convex surface. The convex surface may define a portion of a sphere.

According to yet another aspect, the present disclosure provides a filter assembly. The filter assembly may include a housing and a nut plate. The housing may define a longitudinal axis and include an inner surface surrounding the longitudinal axis. The nut plate may be disposed within the housing and may include a lower end, an upper end, and an outer wall extending between the upper end and the lower end. The lower end and the outer wall may include a plurality of protrusions configured to engage the inner surface.

In some implementations, at least one of the plurality of protrusions extends in a radial direction from the outer wall of the nut plate. The at least one of the plurality of protrusions may extend in an axial direction from the lower end of the nut plate. The at least one of the plurality of protrusions may include a convex surface. In some implementations, the convex surface defines a portion of a sphere.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
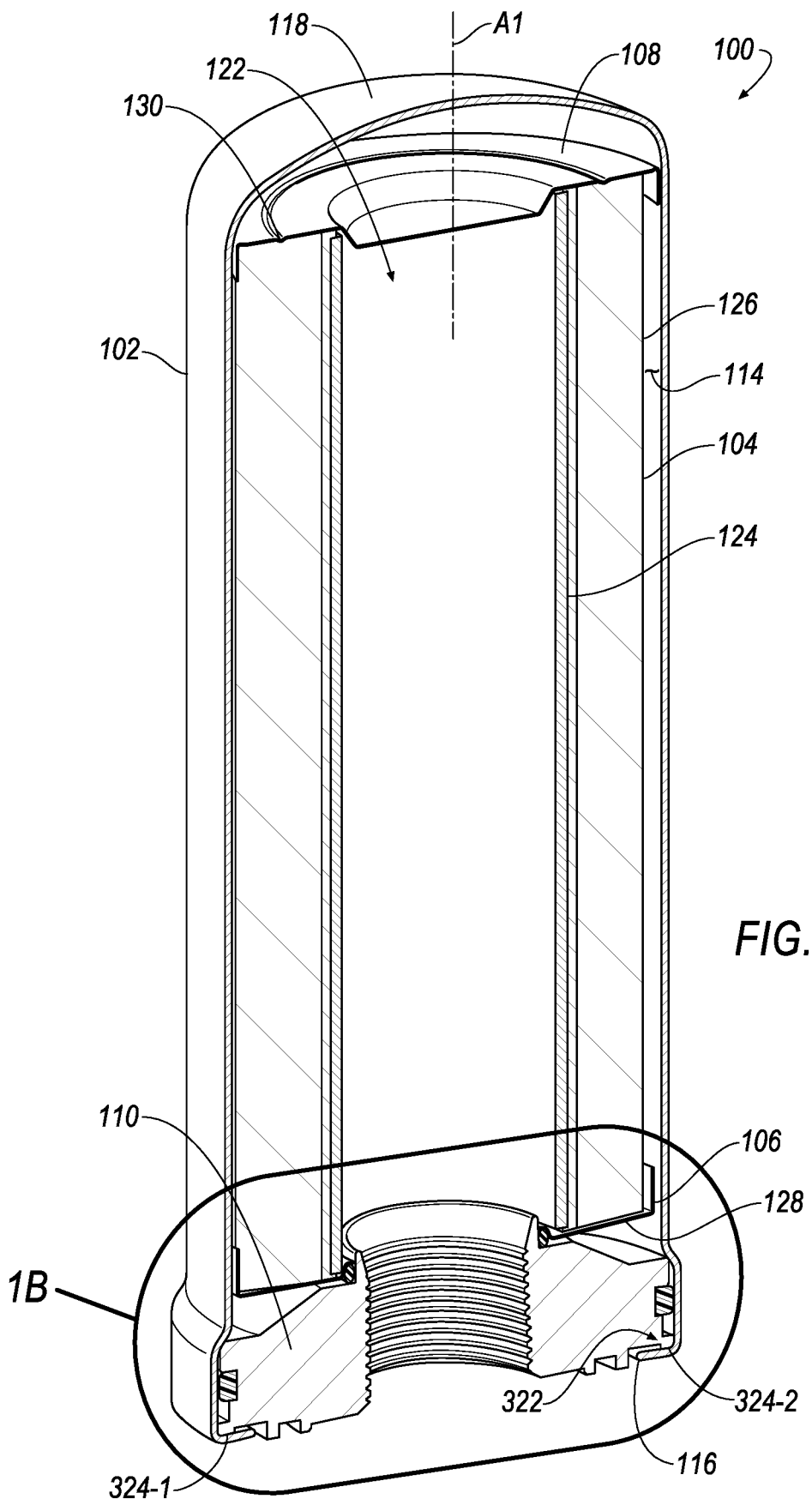
FIG. 1A is a cross-sectional view of a filter assembly in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Referring to FIGS. 1A-3, a filter assembly 100 is shown. In some implementations, the filter assembly 100 may be utilized to filter a flow of fuel therethrough. It will be appreciated, however, that the filter assembly 100 may be utilized to filter a flow of other fluids within the scope of the present disclosure.

The filter assembly 100 may include a housing 102, a filter element 104, a proximal end cap 106, a distal end cap 108, a nut plate 110, one or more seal members 112-1, 112-2, . . . 112-n, and a biasing member 113. The housing 102 may define a generally cylindrical construct defining a longitudinal axis A1. The housing 102 may include an inner surface 114 surrounding, and extending along (e.g., parallel to) at least a portion of, the longitudinal axis A1 from a proximal end 116 of the housing 102 to a distal end 118 of the housing 102. The inner surface 114 may include a proximal portion 114a extending from the proximal end 116, a distal portion 114b extending from the distal end 118, and an intermediate portion 114c extending from the proximal portion 114a to the distal portion 114b. The proximal portion 114a and the distal portion 114b may each define a generally circular cylindrical shape extending along (e.g., parallel to) the longitudinal axis A1. In some implementations, the proximal end 116 may be open and the distal end 118 may be closed. In this regard, at least a portion of the distal portion 114b of the inner surface 114 may extend radially inwardly. As will be explained in more detail below, in an assembled configuration, the proximal portion 114a engages the nut plate 110 to inhibit movement of the nut plate 110 and/or the proximal end cap 106 relative to the housing 102.

The intermediate portion 114c of the housing 102 may extend in a direction transverse to, and about, the longitudinal axis A1. For example, in some implementations, the intermediate portion 114c may extend outward (e.g., away from the axis A1) from the distal portion 114b, and inward (e.g., toward the axis A1) from the proximal portion 114a. In some implementations, the intermediate portion 114c may define a frustoconical shape extending along and about the longitudinal axis A1. In this regard, the intermediate portion 114c may define an increasing diameter Dc extending from the proximal portion 114a to the distal portion 114b, such that the proximal portion 114a defines a diameter Da that is greater than a diameter Db defined by the distal portion 114b.

The filter element 104 may include a perforated tube 124 and a filter media 126 surrounding the perforated tube 124. The filter media 126 may include a proximal end 128 and a distal end 130. In some implementations, the filter media 126 defines a generally cylindrical construct extending from the proximal end 128 to the distal end 130. In the assembled configuration, the filter element 104 may be disposed within the housing 102 such that the inner surface 114 surrounds the filter element 104, and the distal end 130 of the filter media 126 is disposed proximate the distal end 118 of the housing 102. The perforated tube 124 defines a passage 122 extending along the longitudinal axis A1.

Figure 1B:
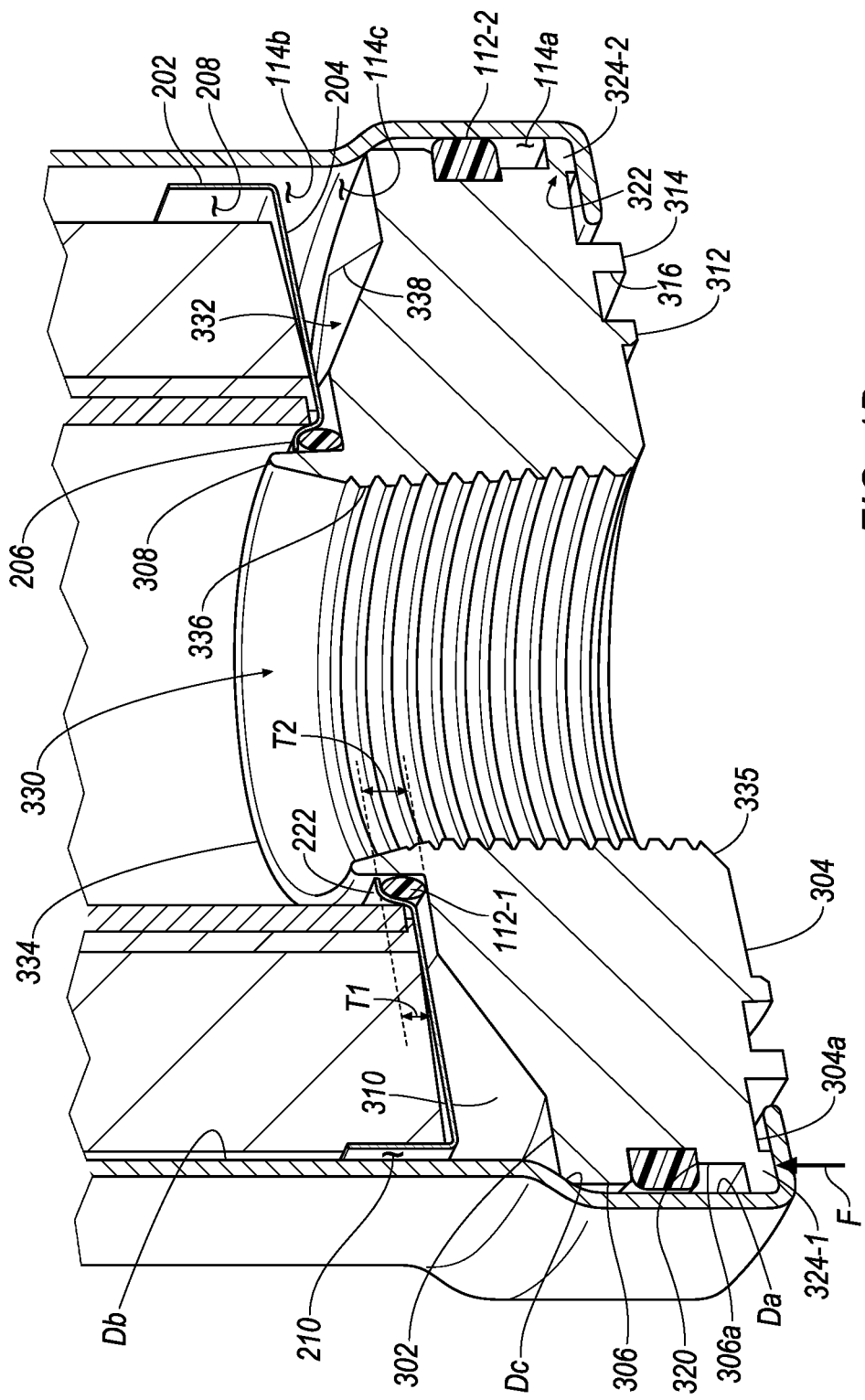
FIG. 1B is cross-sectional view of a portion of the filter assembly of FIG. 1A.
Figure 2:
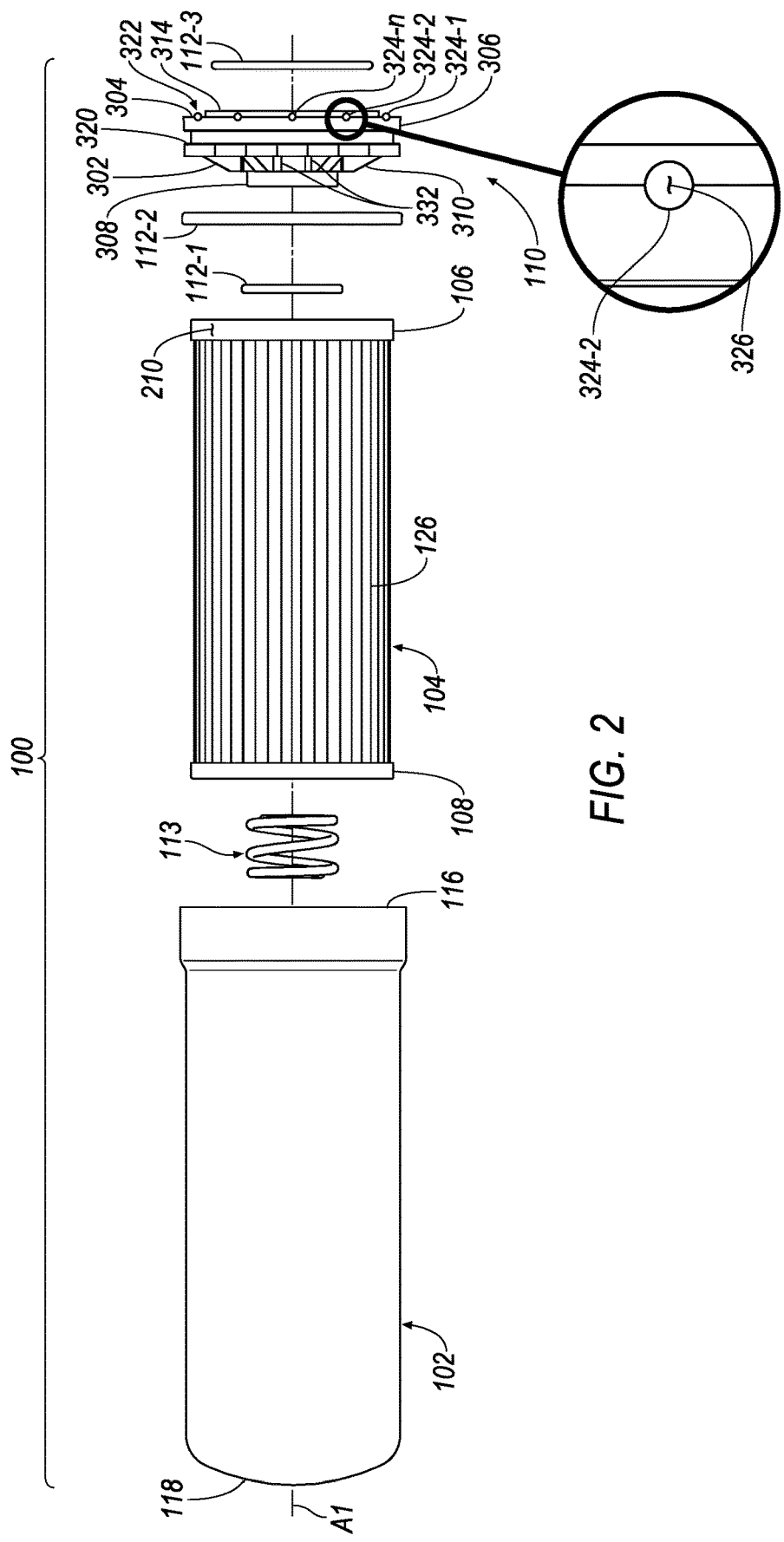
FIG. 2 is an exploded view of the filter assembly of FIG. 1.
Figure 3:
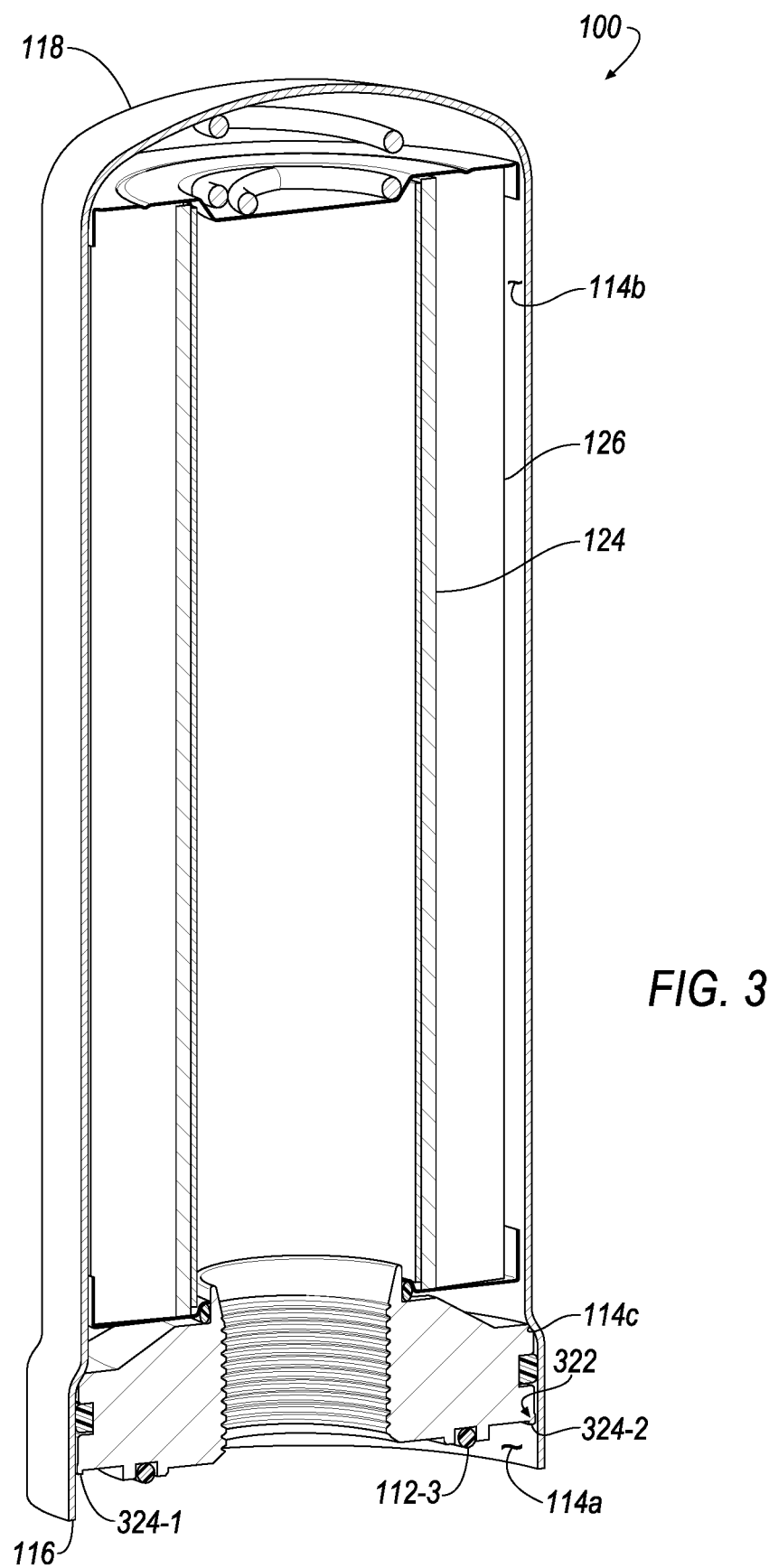
FIG. 3 is a cross-sectional view of the filter assembly of FIG. 1 during a manufacturing method.

With reference to FIGS. 1 and 2, the proximal end cap 106 may define a plate having an outer wall portion 202, a seat portion 204 extending from the outer wall portion 202, and a lip portion 206 extending from the seat portion 204. The outer wall portion 202 may extend along and about the longitudinal axis A1. For example, in some implementations, the outer wall portion 202 extends about the longitudinal axis A1 in a direction substantially parallel to the longitudinal axis A1. The seat portion 204 may extend toward and about the longitudinal axis A1. For example, in some implementations, the seat portion 204 extends about the longitudinal axis in a direction substantially perpendicular to the longitudinal axis A1. The lip portion 206 may extend in a direction transverse to the seat portion 204 and transverse to the longitudinal axis A1. For example, in some implementations, the lip portion 206 defines an arcuate profile extending about the longitudinal axis A1.

The outer wall portion 202, the seat portion 204, and the lip portion 206 may collectively define an upper (relative to the view in FIG. 1) surface 208 of the proximal end cap 106 and a lower (relative to the view in FIG. 1) surface 210 of the proximal end cap 106. The upper surface 208 may define a convex profile extending about the longitudinal axis A1 proximate the lip portion 206. The lower surface 210 may be opposite the upper surface 208 and may define a concave profile extending about the longitudinal axis A1 proximate the lip portion 206. The lower surface 210 may further define an axially-extending depth T1 proximate the lip portion 206. In this regard, the depth T1 may extend from the seat portion 204 to the lip portion 206.

The proximal end cap 106 may further define a central aperture 222 and a plurality of fluid openings (not shown). The central aperture 222 may extend through the upper and lower surfaces 208, 210 of the proximal end cap 106. In some implementations, the central aperture 222 is defined by the lip portion 206 of the proximal end cap 106. The fluid openings may extend through the upper and lower surfaces 208, 210 proximate to the seat portion 204 of the proximal end cap 106. In some implementations, the fluid openings are equally-spaced about the circumference of the proximal end cap 106.

The nut plate 110 may include an upper end 302, a lower end 304, and an outer wall 306. The upper end 302 may include an annular flange 308 and a transition portion 310. The annular flange 308 may extend from the upper end 302 in a direction substantially parallel to the longitudinal axis A1. The transition portion 310 may extend from the annular flange 308 to the outer wall 306. In this regard, the transition portion 310 may extend in a direction transverse to the longitudinal axis A1. In some implementations, the transition portion 310 defines a frustoconical profile extending about the longitudinal axis A1.

The lower end 304 of the nut plate 110 may be opposite the upper end 306 and may include an inner flange 312 and an outer flange 314. The inner flange 312 may extend from the lower end 304 in a direction substantially parallel to, and about, the longitudinal axis A1. The outer flange 314 may extend from the lower end 304 in a direction substantially parallel to, and about, the longitudinal axis A1. In some implementations, the inner flange 312 is concentrically disposed about the outer flange 314, such that the lower end 304 and the inner and outer flanges 312, 314 collectively define a channel 316. The channel 316 may define a rectangular cross-section extending about the longitudinal axis A1. An outer portion 304a of the lower end 304 may extend from the outer flange 314 to the outer wall 306. In some implementations, the outer portion 304a extends in a direction substantially perpendicular to the outer wall 306 and/or substantially perpendicular to the longitudinal axis A1.

The outer wall 306 of the nut plate 110 may extend about the longitudinal axis A1 from the upper end 302 to the lower end 304. In some implementations, the outer wall 306 includes an annular channel 320 and a locking feature 322. The channel 320 may be formed in the outer wall 302 and extend about the longitudinal axis A1. A lower portion 306a of the outer wall 306 may extend from the channel 320 to the lower end 304 of the nut plate 110. In some implementations, the lower portion 306a extends in a direction substantially perpendicular to the outer portion 304a of the lower wall 304 and/or substantially parallel to the longitudinal axis A1.

The locking feature 322 may include a plurality of protrusions 324-1, 324-2, . . . 324-n disposed about the longitudinal axis A1. The protrusions 324-1, 324-2, . . . 324-n may be disposed uniformly (e.g., equally-spaced) about the longitudinal axis A1. In some implementations, the locking feature 322 includes twelve protrusions 324-1, 324-2, . . . 324-n uniformly disposed about the longitudinal axis A1.

Each of the protrusions 324-1, 324-2, . . . 324-n may extend (i) in an axial direction from the lower end 304 (e.g., the outer portion 304a of the lower end 304) of the nut plate 110, and (ii) in a radial direction from the lower portion 306a of the outer wall 306 of the nut plate 110. In some implementations, one or more of the protrusions 324-1, 324-2, . . . 324-n may include a convex surface 326. As an example, the convex surface 326 may define a portion of a sphere. In other implementations, one or more of the protrusions 324-1, 324-2, . . . 324-n may include a plurality of surfaces such that the protrusions 324-1, 324-2, . . . 324-n define a polygonal shape (e.g., a portion of a cuboid) extending in an axial direction from the lower end 304 of the nut plate 110, and in a radial direction from the lower portion 306a of the outer wall 306 of the nut plate 110.

With reference to FIGS. 1A and 1B, the nut plate 110 may further include a central passage 330 and one or more peripheral passages 332 extending through the nut plate 110. For example, the central passage 330 and the one or more peripheral passages 332 may extend from the upper wall 302 to the lower wall 304. In this regard, the upper wall 302 may include an entrance opening 334 in fluid communication with the central passage 330, and the lower wall 304 may include an entrance opening 335 in fluid communication with the central passage 330. In some implementations, the central passage 330 is defined at least in part by a threaded inner surface 336. Similarly, the upper wall 302 may include one or more peripheral entrance openings 338 in fluid communication with the one or more peripheral passages 332, and the lower wall 304 may include one or more peripheral entrance openings (not shown) fluid communication with the one or more peripheral passages 332. In some implementations, the central passage 330 is defined at least in part by a threaded inner surface 336 concentrically disposed about the longitudinal axis A1. The peripheral entrance openings 338 and/or the peripheral passages 332 may be concentrically disposed about the central passage 330.

With reference to FIGS. 1A-3, the seal members 112-1, 112-2, . . . 112-n may include a first seal member 112-1, a second seal member 112-2, and a third seal member 112-3. Each of the first, second, and third seal members 112-1, 112-2, 112-3 may define an annular construct. In this regard, in some implementations, each of the first, second, and third seal members 112-1, 112-2, 112-3 defines an O-ring seal. The first seal member 112-1 may define an axially-extending thickness T2. In some implementations, the thickness T2 is greater than the axially-extending depth T1 of the lip portion 206 of the proximal end cap 106.

In the assembled configuration, the first seal member 112-1 may be disposed about, and in sealing engagement with, the annular flange 308 of the nut plate 110. The second seal member 112-2 may be disposed within the channel 320 of the nut plate 110 such that the second seal member 112-2 is sealingly engaged with the outer wall end 306 of the nut plate 110. The third seal member 112-3 may be disposed within the channel 316 of the nut plate 110 such that the third seal member 112-3 is sealingly engaged with the lower end 304 of the nut plate 110.

With continued reference to FIGS. 1A-3, a method of assembling the filter assembly 110 may include placing the filter element 104 within the housing 102 such that a portion of the filter media 126 or the distal end cap 108 engages the inner surface 114 of the housing 102. The proximal end cap 106 and the nut plate 110 may be placed within the housing 102 such that the proximal end cap 106 engages the proximal end 128 of the filter media 126. In particular, the proximal end 128 of the filter media 126 and/or the perforated tube 124 may engage the distal end 204 of the proximal end cap 106, and the distal end 130 of the filter media 126 and/or the perforated tube 124 may engage the distal end cap 108.

The nut plate 110 may be placed within the housing 102 such that the annular flange 308 is disposed within the central aperture 222 of the proximal end cap 106. In this regard, the first seal member 112-1 may sealingly engage the proximal end cap 106. For example, the first seal member 112-1 may sealingly engage the lip portion 206 of the proximal end cap 106.

At least one of the upper end 302 of the nut plate 110 and the outer wall 306 of the nut plate 110 may engage the intermediate portion 114c of the inner surface 114. In some implementations, the locking feature 322 may engage the proximal portion 114a of the inner surface 114. In particular, one or more of the protrusions 324-1, 324-2, . . . 324-n may engage the proximal portion 114a of the inner surface 114 in order to prevent the nut plate 110 from rotating relative to the housing 102 about the longitudinal axis A1. In some implementations, one or more of the protrusions 324-1, 324-2, . . . 324-n engage a radially-extending extent of the proximal portion 114a and an axially-extending extent of the proximal portion 114a.

The second seal member 112-2 may sealingly engage the proximal portion 114a the housing 102, and the housing 102 may be secured to the nut plate 110. For example, in some implementations, the method includes bending and/or otherwise folding the proximal portion 114a of the housing 102 until a portion of the proximal portion 114a extends in a direction transverse to the longitudinal axis A1. In this regard, the method may include folding the proximal portion 114a of the housing 102 from a first orientation (e.g., FIG.

3) in which an entirety of the proximal portion 114a extends along (e.g., parallel to) the longitudinal axis A1, to a second orientation (e.g., FIG. 1A-2) in which a portion of the proximal portion 114a extends in a direction substantially perpendicular to the longitudinal axis A1. For example, the method may include folding the proximal portion 114a until the proximal portion 114a of the inner surface 114 engages the lower end 304 of the nut plate 110. In particular, the proximal portion 114a of the housing 102 may be crimped radially inwardly to engage the outer portion 304a of the lower end 304 of the nut plate 110. In this regard, the proximal portion 114a of the inner surface 114 may further secure the nut plate 110, the filter element 104, the proximal end cap 106, and the distal end cap 108 relative to the housing 102. In this regard, as illustrated in FIG. 1B, the proximal portion 114a may engage the lower end 304 of the nut plate 110 and apply a force F thereon. An axially-extending component of the force F may be transmitted by the nut plate 110 to the proximal end cap 106 and to the intermediate portion 114c of the surface 114 of the housing 102.

A number of implementations have been described. Nevertheless, it will be understood that various modifications may be made without departing from the spirit and scope of the disclosure. Accordingly, other implementations are within the scope of the following claims.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A filter assembly comprising:
 a housing defining a longitudinal axis and including an inner surface surrounding the longitudinal axis;
 a proximal end cap disposed within the housing and defining a central aperture; and
 a nut plate disposed within the housing and having a flange portion and an outer wall, the flange portion disposed within the central aperture, the outer wall having a plurality of protrusions circumferentially spaced about the longitudinal axis, each of the plurality of protrusions engaging the inner surface to prevent rotation of the nut plate relative to the housing,
 wherein the inner surface includes a proximal portion having a proximal extent extending in a first direction, and a distal extent extending in a second direction transverse to the first direction and wherein the plurality of protrusions engage the proximal extent and the distal extent.

2. The filter assembly of claim 1, wherein at least one of the plurality of protrusions extends in a radial direction from the outer wall of the nut plate.

3. The filter assembly of claim 2, wherein the at least one of the plurality of protrusions extends in an axial direction from a lower end of the nut plate.

4. The filter assembly of claim 3, wherein the at least one of the plurality of protrusions includes a convex surface.

5. The filter assembly of claim 4, wherein the convex surface defines a portion of a sphere.

6. The filter assembly of claim 1, wherein the proximal extent extends in a radial direction and the distal extent extends in an axial direction.

7. The filter assembly of claim 1, further comprising a seal member sealingly engaging the outer wall.

8. The filter assembly of claim 1, further comprising a seal member disposed about the flange portion of the nut plate, wherein the proximal end cap includes a lip portion extending in a direction transverse to the longitudinal axis, the seal member sealingly engaging the lip portion.

* * * * *